(12) United States Patent
Bosch et al.

(10) Patent No.: US 11,899,780 B2
(45) Date of Patent: Feb. 13, 2024

(54) AUTOMATIC ASSESSMENT OF API SERVICE SECURITY STANDING WITH API REPUTATION SCORING

(71) Applicant: Cisco Technology, Inc., San Jose, CA (US)

(72) Inventors: Hendrikus G. P. Bosch, Aalsmeer (NL); Alessandro Duminuco, Milan (IT); Sape Jurriën Mullender, Amsterdam (NL); Jaffar Alaoui, London (GB)

(73) Assignee: CISCO TECHNOLOGY, INC., San Jose, CA (US)

( * ) Notice: Subject to any disclaimer, the term of this patent is extended or adjusted under 35 U.S.C. 154(b) by 261 days.

(21) Appl. No.: 17/226,304

(22) Filed: Apr. 9, 2021

(65) Prior Publication Data

US 2022/0222335 A1 Jul. 14, 2022

Related U.S. Application Data

(60) Provisional application No. 63/136,731, filed on Jan. 13, 2021.

(51) Int. Cl.
*G06F 21/57* (2013.01)
*G06F 21/52* (2013.01)
*G06F 9/54* (2006.01)

(52) U.S. Cl.
CPC .............. *G06F 21/52* (2013.01); *G06F 9/544* (2013.01); *G06F 2221/031* (2013.01)

(58) Field of Classification Search
CPC .... G06F 21/52; G06F 9/544; G06F 2221/031; G06F 21/57; G06F 21/629
See application file for complete search history.

(56) References Cited

U.S. PATENT DOCUMENTS 10,757,139 B1 * 8/2020 Cignetti .............. H04L 63/1433
11,196,839 B1 * 12/2021 Sonawane ............... H04L 63/20
(Continued)

FOREIGN PATENT DOCUMENTS

WO 2013063474 A1 5/2013

OTHER PUBLICATIONS

Patent Cooperation Treaty, International Searching Authority, Notification of Transmittal of International Search Report and the Written Opinion of the International Searching Authority, International Application No. PCT/US2022/070012, dated Mar. 22, 2022, 13 pages.

*Primary Examiner* — Joseph P Hirl
*Assistant Examiner* — Aayush Aryal
(74) *Attorney, Agent, or Firm* — Baker Botts L.L.P.

(57) ABSTRACT

The present disclosure is directed to assessing API service security and may include the steps of identifying an API service called by an application based on information provided by an agent embedded within the application; collecting telemetry associated with the API service, the telemetry collected from one or more telemetry sources and indicating any deficiencies in the API service; generating a reputation score for the API service based on analysis of the collected telemetry; and transmitting the reputation score to at least one of the following: the agent embedded within the application, wherein the reputation score is associated with at least one policy having at least one policy action, and wherein the reputation score is operable to be used by the agent to invoke the at least one policy action relating to use of the API service by the application; or a continuous integration/continuous delivery pipeline associated with the application.

20 Claims, 5 Drawing Sheets

(56) References Cited

U.S. PATENT DOCUMENTS

| | | |
|---|---|---|
| 2014/0075500 A1 | 3/2014 | B'Far et al. |
| 2015/0213449 A1 | 7/2015 | Morrison et al. |
| 2017/0251013 A1* | 8/2017 | Kirti .................. H04L 63/1441 |
| 2018/0373867 A1 | 12/2018 | Kraemer |
| 2019/0014005 A1* | 1/2019 | Lessmann ............. H04L 69/321 |
| 2019/0236610 A1 | 8/2019 | Sadaghiani et al. |
| 2020/0104196 A1* | 4/2020 | Ritchie ............... G06F 9/44536 |
| 2020/0302050 A1* | 9/2020 | Jain ....................... G06F 9/5072 |
| 2021/0067337 A1* | 3/2021 | Bahrami ................... H04L 9/30 |
| 2021/0200564 A1* | 7/2021 | Nalepa .................. G06Q 10/06 |

* cited by examiner

AUTOMATIC ASSESSMENT OF API SERVICE SECURITY STANDING WITH API REPUTATION SCORING

CROSS-REFERENCE TO RELATED APPLICATIONS

This application claims priority to and the benefit of U.S. Provisional Application No. 63/136,731, filed on Jan. 13, 2021, which application is incorporated herein by reference in its entirety.

TECHNICAL FIELD

The present disclosure generally relates to Application Programming Interface (API) service security, and more specifically to systems and methods for automatic assessment of API service security standing with API reputation scoring.

BACKGROUND

When an enterprise application uses APIs from internal or third party services, the users of that application are exposed to certain security risks. These risks include data leakage of personally identifiable information, penetration or hacking of the calling party or application, and/or other nefarious use.

DESCRIPTION OF EXAMPLE EMBODIMENTS

Overview

According to an embodiment, a system may include one or more processors and one or more computer-readable non-transitory storage media comprising instructions that, when executed by the one or more processors, cause one or more components of the system to perform operations including, identifying an API service called by an application based on information provided by an agent embedded within the application; collecting telemetry associated with the API service, the telemetry collected from one or more telemetry sources and indicating any deficiencies in the API service; generating a reputation score for the API service based on analysis of the collected telemetry; and transmitting the reputation score to at least one of the following: the agent embedded within the application, wherein the reputation score is associated with at least one policy having at least one associated policy action, and wherein the reputation score is operable to be used by the agent to invoke the at least one policy action relating to use of the API service by the application; or a continuous integration/continuous delivery (CI/CD) pipeline associated with the application, wherein the reputation score is operable to be used by the CI/CD pipeline to determine deployment policies of the application.

Moreover, the operations may further include defining the at least one policy based on the reputation score and transmitting the at least one policy to the agent.

Additionally, the at least one policy action may mitigate one or more risks associated with use of the API service by the application.

Moreover, the at least one policy may be directed to at least one of the following: one or more Uniform Resource Locators (URLs) associated with the API service; one or more hypertext transfer protocol (HTTP) operations associated with the API service; or one or more defined categories of data transmitted across an API interface to the API service.

Additionally, the reputation score may include a weighted score based on the collected telemetry, wherein one or more weights assigned to the collected telemetry may be updated over time.

Further, the operations may also include updating the reputation score of the API service based on collection of new telemetry. The updated reputation score may be operable to be used by the agent to invoke an updated policy action. The updated reputation score may also be operable to be used by the CI/CD pipeline to update the deployment policies of the application.

According to another embodiment, a method may include the steps of identifying an API service called by an application based on information provided by an agent embedded within the application; collecting telemetry associated with the API service, the telemetry collected from one or more telemetry sources and indicating any deficiencies in the API service; generating a reputation score for the API service based on analysis of the collected telemetry; and transmitting the reputation score to at least one of the following: the agent embedded within the application, wherein the reputation score is associated with at least one policy having at least one associated policy action, and wherein the reputation score is operable to be used by the agent to invoke the at least one policy action relating to use of the API service by the application; or a continuous integration/continuous delivery (CI/CD) pipeline associated with the application, wherein the reputation score is operable to be used by the CI/CD pipeline to determine deployment policies of the application.

According to yet another embodiment, one or more computer-readable non-transitory storage media may embody instructions that, when executed by a processor, cause the performance of operations, including identifying an API service called by an application based on information provided by an agent embedded within the application; collecting telemetry associated with the API service, the telemetry collected from one or more telemetry sources and indicating any deficiencies in the API service; generating a reputation score for the API service based on analysis of the collected telemetry; and transmitting the reputation score to at least one of the following: the agent embedded within the application, wherein the reputation score is associated with at least one policy having at least one associated policy action, and wherein the reputation score is operable to be used by the agent to invoke the at least one policy action relating to use of the API service by the application; or a continuous integration/continuous delivery (CI/CD) pipeline associated with the application, wherein the reputation score is operable to be used by the CI/CD pipeline to determine deployment policies of the application.

Technical advantages of certain embodiments of this disclosure may include one or more of the following. The systems and methods described herein may allow for assessment of API security when an API service is called by an enterprise applications. Specifically, the present disclosure is directed to analyzing the security of the API service through externally- or internally-obtained telemetry and/or penetration testing, generating a reputation score based on the analysis, and defining and/or enforcing policies on the use of the API service by the enterprise application based on the reputation score.

Other technical advantages will be readily apparent to one skilled in the art from the following figures, descriptions, and claims. Moreover, while specific advantages have been enumerated above, various embodiments may include all, some, or none of the enumerated advantages.

Example Embodiments

Application developers may use services through APIs when implementing their enterprise applications. By using API services in applications, a developer may leverage available technology and significantly speed up the development cycle. However, the use of API services (whether internal or external) exposes applications to nefarious use. When an enterprise application calls API services hosted by internal or third party service providers, enterprise data, which may include enterprise secrets, may be exposed to those internal or external services and may leak to unintended recipients. Moreover, the application may be additionally exposed to penetration attacks, e.g., through buffer overruns, cross-site scripting, and a whole body of additional attacks. A list of such attacks may be found via Open Source Web Security Project (OWASP) API Top 10, the MITRE ATT&CK vector, Common Vulnerabilities and Exposures (CVEs), and more.

The present disclosure is generally directed to systems and methods for automatic assessment of API service security. Specifically, the present disclosure describes mechanisms that may be initiated when an enterprise application calls an API service, wherein telemetry may be collected on the API service, the collected telemetry may be analyzed, an API reputation score may be generated based on the analysis, and the API reputation score may be used to define and/or enforce policies on the enterprise application, including the use of the API service by the enterprise application. For example, based on the API reputation score, the call to the API service by the enterprise application may be blocked or reported, and/or an alert for security personnel may be created. In some cases, the enterprise application making use of the poorly scored API service may be prevented from running. Additionally, policies may be invoked for specific Uniform Resource Locators (URLs), specific hypertext transfer protocol (HTTP) operations, and/or specific types of data to be carried across an API interface to the API service. It is to be understood that the present disclosure contemplates a broad range of policies that may be defined and enforced on the enterprise application, as further described below.

Figure 1:
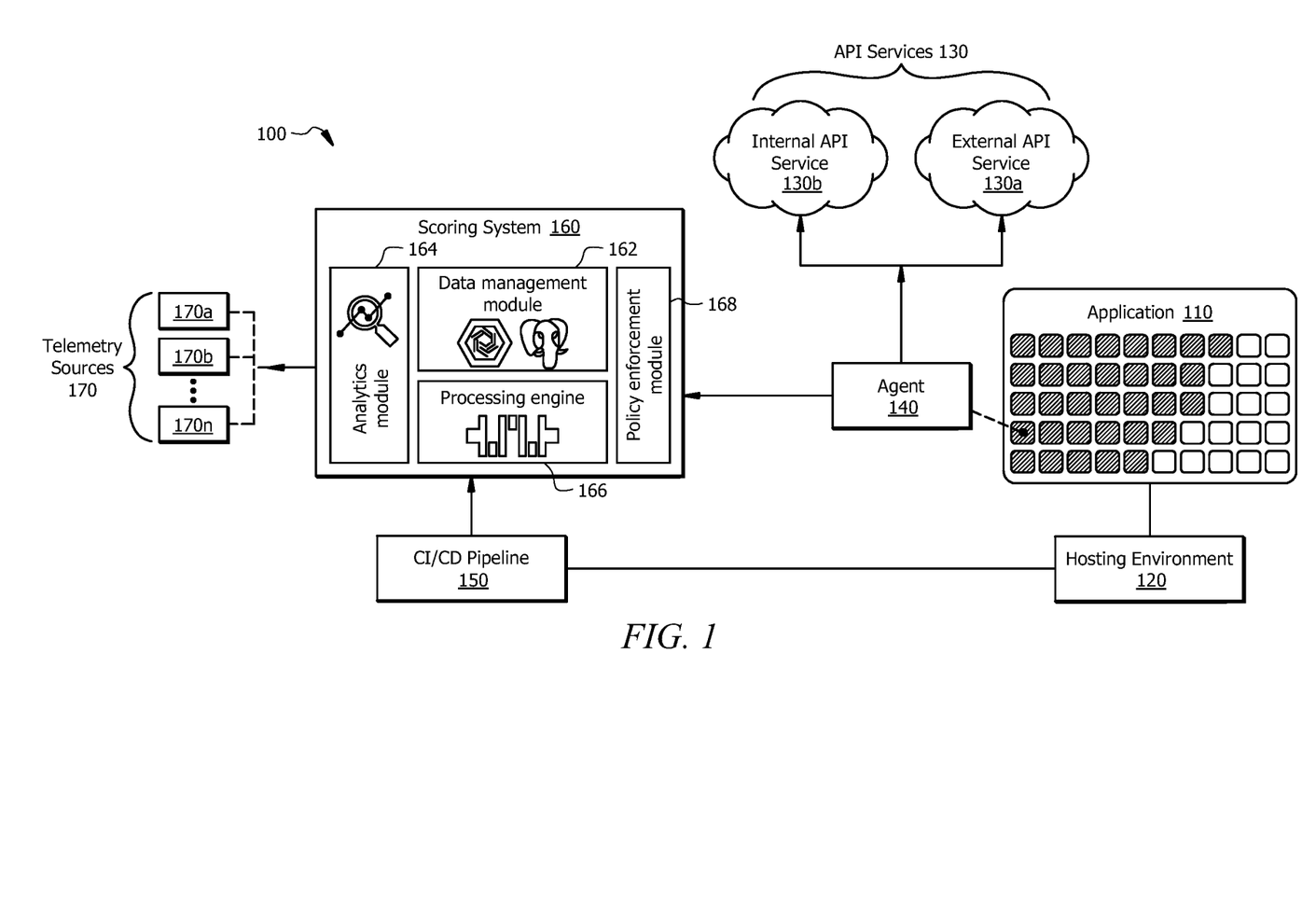
FIG. 1 illustrates a system for automatic assessment of API service security standing via API reputation scoring, in accordance with certain embodiments.

FIG. 1 depicts a system 100 for automatic assessment of API service security standing via API reputation scoring. System 100 may include various components, modules, and/or elements, as further described herein. As shown in FIG. 1, system 100 includes an enterprise application 110. In an embodiment, the enterprise application 110 may comprise an enterprise application (whether active/live, not active/live, or otherwise) that is running in a hosting environment. By way of example, the enterprise application may comprise a series of containers or virtual machines operating in a service mesh, or may be based on a serverless or Function-as-a-service (FaaS) framework. The enterprise application 110 may be hosted in any hosting environment 120, such as Kubernetes, Google Cloud, or any other on-premise, public, private, or hybrid clouds. In another embodiment, the enterprise application 110 may comprise an application that is being developed and that is running in a staged cloud environment (not shown). It is to be understood that system 100 may include any number or types of enterprise applications. However, for purposes of illustration, the present disclosure will be described in conjunction with a single enterprise application 110.

As the enterprise application 110 is running, it may call an API service and establish a Transport Layer Security (TLS) session with the API service. An API service may be defined as a software application having an application programming interface. The API service may comprise an external API service 130a (i.e., a remote service implemented by a third-party service provider and located on a third-party server), or an internal API service 130b (i.e., associated with the enterprise). System 100 may comprise a plurality of external API services and/or a plurality of internal API services, any of which may be called by the enterprise application 110. In FIG. 1, API services 130 refers to the collective set of external and internal services that may be available for the enterprise application 110 to call. For purposes of illustration and not limitation, the present disclosure may describe the operation of system 100 in conjunction with a single API service, e.g., the external API service 130a.

Once an application 110 calls an API service (e.g., external API service 130a), the application 110 may decide to "consume" the external API service 130a. By "consuming" the external API service 130a, the application 110 may connect to an API endpoint associated with the external API service 130a and execute a remote procedure call (RPC) by way of, e.g., an HTTP request/response across the TLS session. When an enterprise application 110 consumes the external API service 130a, enterprise data may be exposed to the external API service 130a and enterprise secrets may be at risk. The systems and methods of the present disclosure seek to minimize such risks, as further described below.

With continued reference to FIG. 1, in accordance with the present disclosure, an application agent 140 (also referred to in the present disclosure as an "agent") may be embedded within the enterprise application 110. The agent 140 may comprise a software module based on any applicable service mesh technology. In an embodiment, the agent 140 may be based on Istio/envoy technology and may be configured to interact with data plane traffic. In particular, the agent 140 may be configured to record information relating to calls that are made by the application 110 to any/all API services 130. For example, for a given API service, e.g., the external API service 130a, the agent 140 may record information such as the API identifier associated with the external API service 130a, an endpoint associated with the external API service 130a (e.g., its IP address, information related to the hosting party of the IP address, the autonomous system number (ASN), the domain name system (DNS) information, etc.), its connection parameters (e.g., Transmission Control Protocol/User Datagram Protocol (TCP/UDP), Quick UDP Internet Connections (QUIC), Hypertext Transfer Protocol/TLS (HTTP/TLS) parameters, application parameters, data parameters), etc. The agent 140 may report this information to a reputation scoring system 160. The agent 140 may also report information relating to the enterprise application 110 calling the external API service 130*a*, e.g., the APP identifier associated with the enterprise application 110. In an embodiment, the agent 140 may report this information to the reputation scoring system 160 by storing the information in a database associated with the reputation scoring system 160. In an embodiment, the agent 140 and/or the reputation scoring system 160 may additionally be configured to detect normal and/or abnormal behavior of the enterprise application 110 by long-term correlation of call-logs. Although FIG. 1 shows one agent embedded in the enterprise application, it is to be understood that certain implementations may include more than one agent (e.g., where an enterprise application includes multiple pods, each pod may be associated with an agent).

The reputation scoring system 160 may comprise a software as a service (SaaS) or other web-based software or may be hosted on-premises. The reputation scoring system 160 may include a data management module 162 (for storing information associated with the enterprise application 110 and the external API service 130*a* called by an enterprise application 110), an analytics module 164 (for collecting telemetry associated with the external API service 130*a* called by the application 110), a processing engine 166 (for processing the collected telemetry and generating a reputation score associated with the external API service 130*a*), and a policy enforcement module 168 (for defining and/or articulating one or more policies to be enforced with respect to the enterprise application 110 and/or the external API service 130*a* called by the enterprise application 110). Each of these will be described in turn. Additionally, it is to be understood that while the present disclosure describes the functionality of the reputation scoring system 160 in conjunction with a single API service (e.g. external API service 130*a*) called by a single enterprise application 110, it is be understood that the functionality of the reputation scoring system 160 is operable to manage and process data associated a plurality of API services 130 and/or a plurality of enterprise applications.

The data management module 162 of the reputation scoring system 160 stores information (as described above) received from an agent 140. The information may be associated with the enterprise application and/or the external API service 130*a* called by an enterprise application 110. Once the information is stored in the data management module 162, the reputation scoring system 160 may identify the relevant enterprise application 110 and the external API service 130*a* called by the application 110, and then collect telemetry on that external API service 130*a*. In an embodiment, the step of storing the information in the data management module 162 may prompt the reputation scoring system 160 to identify the application 110 and the external API service 130*a* called by the application 110, and then collect the relevant telemetry.

Specifically, the analytics module 164 of the reputation scoring system 160 may collect telemetry for the external API service 130*a* and/or its associated API endpoint(s) from one or more telemetry sources. For clarity, FIG. 1 shows a first telemetry source 170*a*, a second telemetry source 170*b*, and an n$^{th}$ telemetry source 170*n*, collectively referred to as telemetry sources 170. Telemetry sources 170 may include third party sources including public and private telemetry providers that observe client/server communications and provide data associated therewith. The collected telemetry may include, but is not limited to, TLS information associated with the external API service 130*a*, including its version and certificates; information relating to the host server associated with the external API service 130*a*; the particular software packages used by the external API service 130*a*, including any vulnerabilities that may be listed against those packages; the location the external API service 130*a* is operating from; any violations of any national data protection regulations, etc. The collected telemetry may further include historical information about the external API service 130*a*, including information about any malware, adware, typosquat, and/or other nefarious material associated with the external API service 130*a*. The collected telemetry may additionally include information relating to the subset of available API services that actually gets used. The telemetry sources may further determine any deficiencies in the external API service 130*a*, e.g., any failures in the external API service 130*a* to implement what is stipulated by its specification, any data leaks, any authorization faults and/or buffer overrun attempts by the external API service 130*a*, any issues with malware, any detected spyware on the applicable domain etc.

Telemetry may also be collected based on penetration testing conducted by the reputation scoring system 160 itself, i.e., to identify potential vulnerabilities and test whether the vulnerabilities are real. Telemetry may further be collected based on performance testing, i.e., by evaluating factors such as availability, reliability, performance parameters, and the hosting environment of the external API service 130*a*. In accordance with the present disclosure, it is to be understood that, without limitation, telemetry may be collected from any source and may be based on any manner, type, or category of information. All of this information may be reported by the telemetry sources 170 and/or other applicable sources into the reputation scoring system 160.

The processing engine 166 of the reputation scoring system 160 may analyze the collected telemetry and generate an API reputation score for the external API service 130*a*. The API reputation score may comprise a weighted score based on the collected telemetry, wherein one or more weights may be assigned to the various categories or types of collected telemetry. In an embodiment, the collected telemetry may be binned based on category, the number of negative occurrences or deficiencies in each category counted, and a weight assigned to each of the bins. The one or more weights may be updated or modified over time by user or machine configuration. Based on the weighted bins, a reputation score may be derived against an API endpoint and/or service associated with the external API service 130*a*. In another embodiment, the API reputation score may be derived based on the "worst-case" negative occurrence or deficiency in one or more of the bins or categories of collected telemetry, which in one instance, may be determined by policy. If no specific endpoint information is available, the reputation score may be based on the external API service 130*a* as a whole (i.e., based on a collection of API endpoints). If no information is available for either an API endpoint or the external API service 130*a* as a whole, the reputation score may be determined for the provider of software associated with the external API service 130*a*.

In an embodiment, the reputation score may comprise a letter score (e.g., between A and F), a numerical score (e.g., between 1-100), or some other form of graded score, and may operate similar to a FICO score used in the financial sector. Specifically, the reputation score represents the probable level of risk that the enterprise application 110 may be exposed to if it calls or consumes the external API service 130a or its associated endpoint. In an embodiment, the reputation score is stored in the agent 140 of the application, and the agent 140 may use the reputation score to invoke one or more policy actions, as described below.

In an embodiment, the reputation score of the external API service 130a may be updated and/or may change over time. Thus, while an enterprise application 110 may call the external API service 130a at time X, if at time Y (with Y>X) the reputation of the external API service 130a has changed (as reflected based on analysis of newly collected telemetry), the reputation score may be updated accordingly. For example, the updated reputation score may reflect that the security standing of the external API service 130a has improved or has diminished.

Next, the policy enforcement module 168 of the reputation scoring system 160 may define one or more policies to be enforced based on the API reputation score. The term "define" broadly refers to articulation of one or more policies within the policy enforcement module 168 of the reputation scoring system 160. These policies may be articulated by a user(s), a machine, and/or the reputation scoring system 160 itself. In one example, the policy enforcement module 168 may define one or more policies via functionality that enables programmers, cloud architects, security personnel and/or CISOs of the enterprise to articulate and/or configure policies within the policy enforcement module 168 of the reputation scoring system 160. In another example, the policy enforcement module 168 may define one or more policies via a separate machine, module, or a component that is configured to articulate policies and communicate those policies to the policy enforcement module 168 of the reputation scoring system 160. In yet another example, the one or more policies may be auto-generated (and therefore "defined") by the policy enforcement module 168 itself through machine-learning, AI, or other mechanisms in the art.

In an embodiment, the policies defined by the policy enforcement module 168 may be defined in response to (i.e., after generation of) the reputation score and then stored in the policy enforcement module 168. In other words, policies may be defined and created against the first derivative of the collected telemetry and the resulting reputation score. In another embodiment, the policies may be defined prior to generation of the reputation score and may already be stored within the policy enforcement module 168.

The one more policies defined by policy enforcement module 168 may be associated with one or more policy actions, which are the specific actions to be taken if the conditions of the policy are satisfied. Policy actions may be designed to mitigate risks associated with use of the external API service 130a by the enterprise application 110. The policies and their associated policy actions may be specific to a particular API service, or may be generally applicable to all API services that may be called by the application 110. By way of example, an API-specific policy may state that the RPC to a particular external API service should be blocked if the reputation score of the external API service is at or below a reputation score of "B". Thus, if the reputation score of the external API service is determined to be a "C," for example, the policy action associated with the policy may be invoked and the RPC to the external API service may be blocked. In another example, a general policy may state that the enterprise application 110 may not run unless all API services called by the application 110 have a reputation score of "A". Thus, if the reputation score of a given API service called by the application 110 is "B," the application may be prohibited from running or actively stopped. Other policy actions may include quarantining the application, increasing log-levels for the application, alerting security personnel or officers within the enterprise by way of channel-based messaging (e.g., slack or slack-like messaging), creating work orders for developers, and/or initiating Runtime Application Self-Protection (RASP) functions such as augmenting the call to mitigate the risks. It is to be understood that the present disclosure contemplates that virtually any policy having any associated policy action, regardless of manner, type, or stringency, may be defined. Policies may range in degree from, on the one hand, allowing the application to call/consume virtually any API service, to on the other hand, blocking the application from calling/consuming virtually every API service.

In an embodiment, individual telemetry collected from the telemetry sources may also be analyzed and used to formulate specific policies against the observations (e.g., policies may include avoiding establishing a connection to endpoints that are non-compliant to regulations, avoiding calls to API services known to host malware, etc.). These policies also may be defined and stored in the policy enforcement module 168.

In an embodiment, policies may also be directed to Uniform Resource Locators (URLs) associated with the API service, one or more hypertext transfer protocol (HTTP) operations associated with the API service, and/or one or more defined categories of data transmitted across an API interface to the API service. For example, policies may dictate how domain names in URLs are resolved, e.g., which DNS service is used, what protocol is used to protect the DNS requests (e.g., DNS over TLS, DNS over HTTPS), etc. Policies may also be directed to the protocols used for communications underlying the API service, e.g., HTTP, HTTP over TLS, HTTP over QUIC, etc. Policies may further be directed to the physical location of network connections, e.g., inside an enterprise, inside a trusted cloud provider, over the open internet, etc. Policies may also be directed to types of data to prevent, e.g., certain types of secure data from being transmitted to the API service. By way of example, suppose "Acme," provides multiple API services such as voice and Short Message Service (SMS). Because voice and SMS may be independent services, they may be associated with independent API reputation scores. Within each of these services, there may be one or more HTTP methods, and each of these methods may be associated with policies. Further, data carried into each method may be classified, and policies may be defined allowing or prohibiting a method based on the reputation score of the API service.

To further illustrate, suppose that Acme's API service associated with voice (e.g., api.acme.com/api/v1/voice) is assigned a reputation score of "A", and by policy, an enterprise application is permitted to call the API service. Yet, there may be other defined sub-categories of policies associated with specific features of that API service, e.g., a policy that prohibits deletion of voice messages on that API service. In this manner, policies may be defined for a variety of methods, e.g, GET, PUT, POST and DELETE. In another example, suppose the Acme API service includes particular operations, such as SMS. A policy may be defined that enables that particular operation (e.g., api.acme.com/api/v1/sms), while the disabling the operation for voice message. Additionally, with respect to data-specific policies, when data fields are (automatically or manually) classified when performing an operation, policies can be executed that prohibit the sending of certain classified data (e.g., an individual's personal information such as social security number or credit card number). In other words, data-specific policies may be defined in response to (or even apart from the reputation scores). The policy enforcement module 168 may be considered a programmable proxy that acts as a security gateway towards internal or external services, while using the reputation of the target API service as a guide on which policies to act upon.

While policies may be defined and/or articulated in the reputation scoring system 160, they are enforced (and the corresponding policy actions invoked) by the agent 140. Specifically, the reputation score generated by the reputation scoring system 160 may be transmitted to the agent 140, and used by the agent 140 to invoke one or more policy actions that are tied to the policies defined in the policy enforcement module 168 and relate to the use of the external API service 130a by the application 110. In an embodiment, the agent 140 may comprise runtime application self-protection (RASP) and/or web application firewall (WAF) controls that enforces the policies defined by the policy enforcement module 168 of the reputation scoring system 160. The RASP/WAF controls may be integrated within the agent 140 or may be incorporated as a separate module that operates in conjunction with the agent 140 to enforce the defined policies. In an embodiment, reputation scores, including historical reputation scores, of any number of API services may be stored in the agent 140 (or in the system behind it). Thus, if the reputation score of a given API service has been updated (i.e., either improves and satisfies the conditions required by an associated policy, or diminishes and fails to satisfy the conditions of the associated policy), the agent 140 may respond accordingly based on the defined policy by invoking an updated policy action.

In another embodiment, as further described in conjunction with FIG. 3 below, where the enterprise application 110 comprises an application that is under development, the reputation score generated by the reputation scoring system 160 may be transmitted to a continuous integration/continuous delivery (CI/CD) pipeline 150. The CI/CD pipeline includes a CD phase that allows for the staging of the application in a testing mode, wherein developers may learn the API services called by the application. In accordance with the present disclosure, the reputation score(s) may be derived for the called API services and may be used by the CI/CD pipeline 150 to determine deployment policies for the application 110. Specifically, as the enterprise application 110 runs in a staged cloud environment, the agent 140 may report to the reputation scoring system 160 the API services (and associated API endpoints) called by the application 110. This information may be stored in the data management module 162, along with the APP identifier and API identifier(s). The reputation scoring system 160 may obtain external telemetry for those API endpoints and/or services, and/or produce its own telemetry, as described above. The reputation scoring system 160 may then generate a reputation score for each of the called API services. An overall or composite score may be generated from the plurality of reputation scores. In an embodiment, the composite score may comprise a weighted score based on the plurality of reputation scores. In another embodiment, the composite score may comprise a (non-weighted) set or collection of reputation scores. The composite score, whether a weighted score or a set or collection of API reputation scores, may be made available to the CI/CD pipeline (including by notification to the developer), and may be used to determine whether and/or how to deploy the staged application. If the developer is satisfied with the overall results of the API reputation scoring, they may initiate deployment of the application. In an embodiment, deployment policies may be created and enacted based on the API reputation score(s). If the deployment does not violate the defined policies, the enterprise application 110 may be rolled out for production. If any of the policies are violated, corrective action may be taken, including denying deployment of the application. By way of example and not limitation, reasons for denying application deployment may include that the called API services are not on an approved list, the called API services may have a poor reputation score, etc.

In an embodiment, if the reputation score of a given API service has been updated (i.e., either improves and satisfies the conditions required by an associated policy, or diminishes and fails to satisfy the conditions of the associated policy, based on new telemetry collected by the reputation scoring system 160), the updated reputation score may further be used by the CI/CD pipeline to update the deployment policies for the application. For example, if the reputation score has declined, an enterprise application that was initially approved for deployment may be held back for further evaluation, may be the subject of updated or newly-defined policies, or may be subject to other updated deployment policies, as understood by one in the art.

Figure 2:
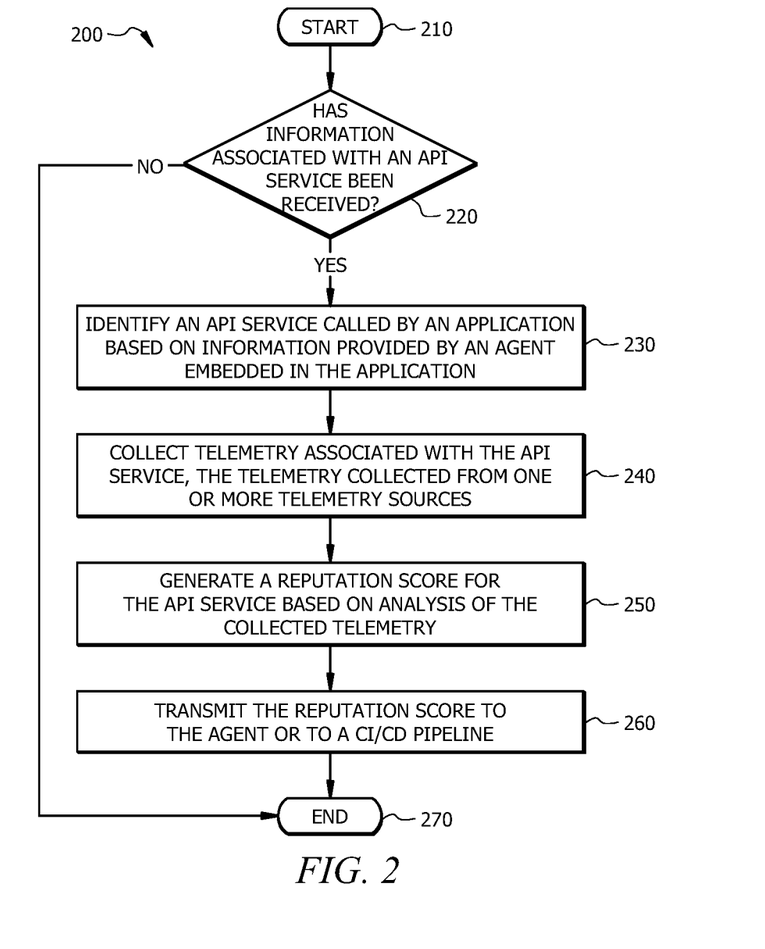
FIG. 2 illustrates a flow diagram of a method for automatic assessment of API service security standing via API reputation scoring, in accordance with certain embodiments.

Reference is now made to FIG. 2, wherein is shown a method 200 for automatic assessment of API service security standing via API reputation scoring, in accordance with the present disclosure. The steps of method 200 may be in accord with the operations outlined in conjunction with the system 100 of FIG. 1. As such, similar and corresponding terms described in conjunction with FIG. 1 may have the same meaning when used in conjunction with method 200 of FIG. 2. Additionally, the present disclosure incorporates by reference the description of FIG. 1 to the description of FIG. 2 for the purposes of explaining, expounding upon, or otherwise clarifying the steps of method 200.

Method 200 may be performed in any environment suitable for hosting and/or running web or cloud-based applications. Method 200 may involve an enterprise application. In an embodiment, the enterprise application may comprise an application (whether active/live, not active/live, or otherwise) that is running in a hosting environment. By way of example, the enterprise application may comprise a series of containers or virtual machines operating in a service mesh, or may be based on a serverless or FaaS framework. The enterprise application and may be hosted in any hosting environment, such as Kubernetes, Google Cloud, or any other on-premise, public, private, or hybrid clouds. In another embodiment, the enterprise application may comprise an application that is being developed and that is running in a staged cloud environment. While running, the enterprise application may call an API service. The API service may be an external API service (i.e., a remote service implemented by a third party service provider and located on a third party server), or an internal API service (i.e., implemented by an enterprise). When an enterprise application calls and/or consumes an API service, enterprise data may be exposed to the API service and enterprise secrets may be at risk. Method 200 is directed to minimizing such risks.

Embedded within the enterprise application may be an application agent. The agent may comprise a software module based on, e.g., Istio/envoy technology. The agent may be configured to record information relating to calls that are made by the application to any/all API services. For example, for a given API service, the agent may record information such as the API identifier associated with the API service, the endpoints associated with the API service (e.g., its IP address, information related to the hosting party of the IP address, the autonomous system number (ASN), the domain name system (DNS) information, etc.), its connection parameters (e.g., TCP/UDP, QUIC, HTTP/TLS parameters, application parameters, data parameters), etc. The agent may report this information, along with information (e.g., APP identifier) relating to the enterprise application calling the API service to a reputation scoring system by storing the information in a database associated with the reputation scoring system. Although the present disclosure describes the agent embedded in the enterprise application in the singular (i.e., as one agent), it is to be understood that certain implementations may include more than one agent (e.g., where an enterprise application includes multiple pods, each pod may be associated with an agent).

The reputation scoring system (as described in conjunction with FIG. 1) may comprise a software as a service (SaaS) or other web-based software or may be hosted on-premises. The reputation scoring system may include a plurality of modules and systems for storing information associated with the API service called by the enterprise application, for collecting telemetry associated with the API service called by the enterprise application, for processing the collected telemetry and generating a reputation score associated with the API service, and for defining and/or articulating one or more policies to be enforced with respect to the API service, as described below. Additionally, it is to be understood that while method 200 is described in conjunction with a single API service called by a single enterprise application, method 200 may be applied to plurality of API services and/or a plurality of enterprise applications.

In an embodiment, the steps of method 200 may be performed from the perspective of the reputation scoring system. However, it is to be understood that method 200 may be performed by any component, element, or module in the applicable hosting environment, without departing from the spirit or scope of the present disclosure.

The method 200 may begin at step 210. At step 220, the reputation scoring system may determine whether information associated with a called API service has been received. As described above, when an application calls an API service, the agent embedded within the application will transmit the information associated with the enterprise application and the API service to the reputation scoring system and store the information within a database in the reputation scoring system. The reputation scoring system may detect that information relating to the enterprise application and the API service has been received and stored in its database. If, at step 220, it is determined that information associated with an API service has not been received, the method may end at step 270. If, however, at step 220, it is determined that information associated with an API service has been received, the method may proceed to step 230.

At step 230, the reputation scoring system may identify the API service called by an application based on the information provided by the agent. The reputation scoring system may also identify the application calling the API service, as described in conjunction with FIG. 1. At step 240, the reputation scoring system may collect telemetry associated with the API service. The telemetry may be collected from one or more telemetry sources and may indicate any deficiencies in the API service.

As described in conjunction with FIG. 1, telemetry sources may include third party sources including public and private telemetry providers that observe client/server communications and provide data associated therewith. Telemetry may also be collected based on the results of penetration testing, to identify potential vulnerabilities and test whether the vulnerabilities are real. Telemetry may further be collected based on performance testing, i.e., evaluating factors such as availability, reliability, performance parameters, and the hosting environment of the API service. Moreover, telemetry may also be obtained for the API service or its associated endpoint. In accordance with the present disclosure, it is to be understood that, without limitation, telemetry may be collected from any source, may be based on any manner, type or category of information. All of this information may be reported by the one or more telemetry sources into the reputation scoring system.

At step 250, the reputation scoring system may generate a reputation score for the API service based on analysis of the collected telemetry. Specifically, the reputation score may comprise a weighted score based on the collected telemetry. In an embodiment, one or more weights may be assigned to the various categories or types of collected telemetry. Specifically, the collected telemetry collected telemetry may be binned based on category, the number of occurrences or deficiencies in each category counted, and a weight assigned to each of the bins. The one or more weights may be updated or modified over time by user or machine configuration. Based on the weighted bins, a reputation score may be derived against an API endpoint and/or service associated with the API service. In another embodiment, the API reputation score may be weighted in that it is derived based on the "worst-case" negative occurrence or deficiency in one or more of the bins or categories of collected telemetry. If no specific endpoint information is available, the reputation score may be based on the API service as a whole (i.e., based on a collection of API endpoints). If no information is available for either the API endpoint or the API service, the reputation score may be determined for the provider of software.

In an embodiment, the reputation score may comprise a letter score (e.g., between A and F), a numerical score (e.g., between 1-100), or some other graded score, and may operate similar to a FICO score used in the financial sector. Specifically, the reputation score represents the probable level of risk that the enterprise application may be exposed to if it calls or consumes the API service or its associated endpoint.

In an embodiment, the reputation score of the API service may be updated and/or may change over time. Thus, while an application may call the API service at time X, if at time Y (with Y>X) the reputation has changed (as reflected based on analysis of newly collected telemetry), the reputation score may be updated accordingly. Specifically, the reputation score of the API service may be updated based on the collection of new telemetry. The updated reputation score may show the security standing of the external API service has improved or has diminished. By way of example, the reputation score of the API service may be improved if deficiencies associated with the API service have been reduced or mitigated. Likewise the reputation score of the API service maybe diminished if the deficiencies associated with the API service increased or worsened.

Additionally, the reputation score may be associated or linked with at least one policy defined by the reputation scoring system. It is to be understood that the "defining" of one or more policies by the reputation scoring system is to be construed broadly, and may comprise one or more actions taken by a user(s), a machine, and/or the reputation scoring system itself. In one example, the reputation scoring system may include functionality to enable programmers, cloud architects, security personnel and/or CISOs of the enterprise to define, articulate and/or configure policies to enforce a particular security behavior associated with the reputation score. Security policies may include quarantining the API service, restricting parameter transmission, and/or alerting security operations, the developer and/or CISOs responsible for the application. In another example, the policies may be configured by a machine or a component communicably coupled to the reputation scoring system. In yet another example, the one or more policies may be auto-generated (and therefore "defined") by the reputation scoring system itself through machine-learning, AI, or other mechanisms in the art.

In an embodiment, the reputation scoring system may define the policies in response to (i.e., after generation of) the reputation score and then transmit to the agent to carry out enforcement. In other words, policies may be defined and created against the first derivative of observations and reputation scores. In another embodiment, the policies may be defined prior to generation of the reputation score and may already be stored within the reputation scoring system and transmitted to the agent. The agent can act on those policy based on reputation score.

The one more policies defined by the reputation scoring system may be associated with one or more policy actions, which are the specific actions to be taken if the conditions of the policy are satisfied. Policy actions may be designed to mitigate risks associated with use of the API service by the application. The policies and their associated policy actions may be specific to a particular API service, or may be generally applicable to all API services that may be called by the application. It is to be understood that any policy and associated policy action of any manner, type, and/or stringency may be defined, and may range in degree from allowing the application to call/consume virtually any API service to blocking the application from calling/consuming virtually every API service, as described above in conjunction with FIG. 1.

In an embodiment, policies may also be directed to URLs associated with the API service, one or more HTTP operations associated with the API service (e.g., create, read, update, delete), and/or one or more defined categories or classifications of data transmitted across an API interface to the API service. For example, policies may dictate how domain names in URLs are resolved, e.g., which DNS service is used, what protocol is used to protect the DNS requests (e.g., DNS over TLS, DNS over HTTPS), etc. Policies may also be directed to the protocols used for communications underlying the API service, e.g., HTTP, HTTP over TLS, HTTP over QUIC, etc. Policies may further be directed to the physical location of network connections, e.g., inside an enterprise, inside a trusted cloud provider, over the open internet, etc. Policies may also be directed to types of data to prevent, e.g., certain types of secure data from being transmitted to the API service. Thus, when data fields are (automatically or manually) classified when performing an operation, policies can be executed that prohibit the sending of certain classified data (e.g., an individual's personal information such as social security number or credit card number). In other words, data-specific policies may be defined in response to or even apart from the reputation scores, e.g., policies may be created to enforce personally identifiable information and compliancy rules. The reputation scoring system may be considered a programmable proxy that acts as a security gateway and/or proxy towards internal or external services, while using the reputation of the target API service as a guide on which policies to act upon.

At step 260, the reputation scoring system may transmit the reputation score to at least one of the following: the agent embedded within the application or the continuous integration/continuous delivery (CI/CD) pipeline associated with the application. If the reputation score is transmitted to the agent, the reputation score is associated with at least one policy having at least one associated policy action, and the reputation score is operable to be used by the agent to invoke at least one policy action relating to use of the API service by the application. In an embodiment, the agent may include a RASP/WAF control that enforces the policies defined by the reputation scoring system. The RASP/WAF control may be integrated within the agent or may be incorporated as a separate module that operates in conjunction with the agent to enforce the defined policies. In an embodiment, reputation scores, including historical reputation scores, of any number of API services may be stored in the agent. Thus, if the reputation score of a given API service has been updated (i.e., either improves and satisfies the conditions required by an associated policy, or diminishes and fails to satisfy the conditions of the associated policy), the agent may respond accordingly based on the defined policy by invoking an updated policy action. In another embodiment, the agent may load the score on-demand from a backing store.

If the reputation score is transmitted to the CI/CD pipeline associated with the application, the reputation score is operable to be used by the CI/CD pipeline to determine deployment policies for the application, as described in conjunction with FIG. 1 and further described in conjunction with FIG. 3 (below). Specifically, the reputation scoring system may generate an API reputation score for each API service (i.e., plurality of API services) called by the application. An overall or composite score may be generated from the plurality of API reputation scores. In an embodiment, the composite score may comprise a weighted score based on the plurality of reputation scores. In another embodiment, the composite score may comprise a (non-weighted) set or collection of reputation scores. The composite score, whether a weighted score or a set or collection of API reputation scores, may be made available to the CI/CD pipeline (including by notification to the developer) to determine whether and/or how to deploy the staged application. If the developer is satisfied with the overall results of the scoring, they may initiate deployment of the application. In an embodiment, deployment policies may be created and enacted based on the reputation scores. If the deployment does not violate any defined policies, the enterprise application may be rolled out for production. If any of the policies are violated, corrective action may be taken, including denying deployment of the application. By way of example and not limitation, reasons for denying application deployment may include that the called API services are not on an approved list, the called API services may have a poor reputation score, etc. In an embodiment, if the reputation score of a given API service has been updated (i.e., either improves and satisfies the conditions required by an associated policy, or diminishes and fails to satisfy the conditions of the associated policy), the updated reputation score may be used by the CI/CD pipeline to update the deployment policies for the application.

At step 270, the method may end.

Figure 3A:
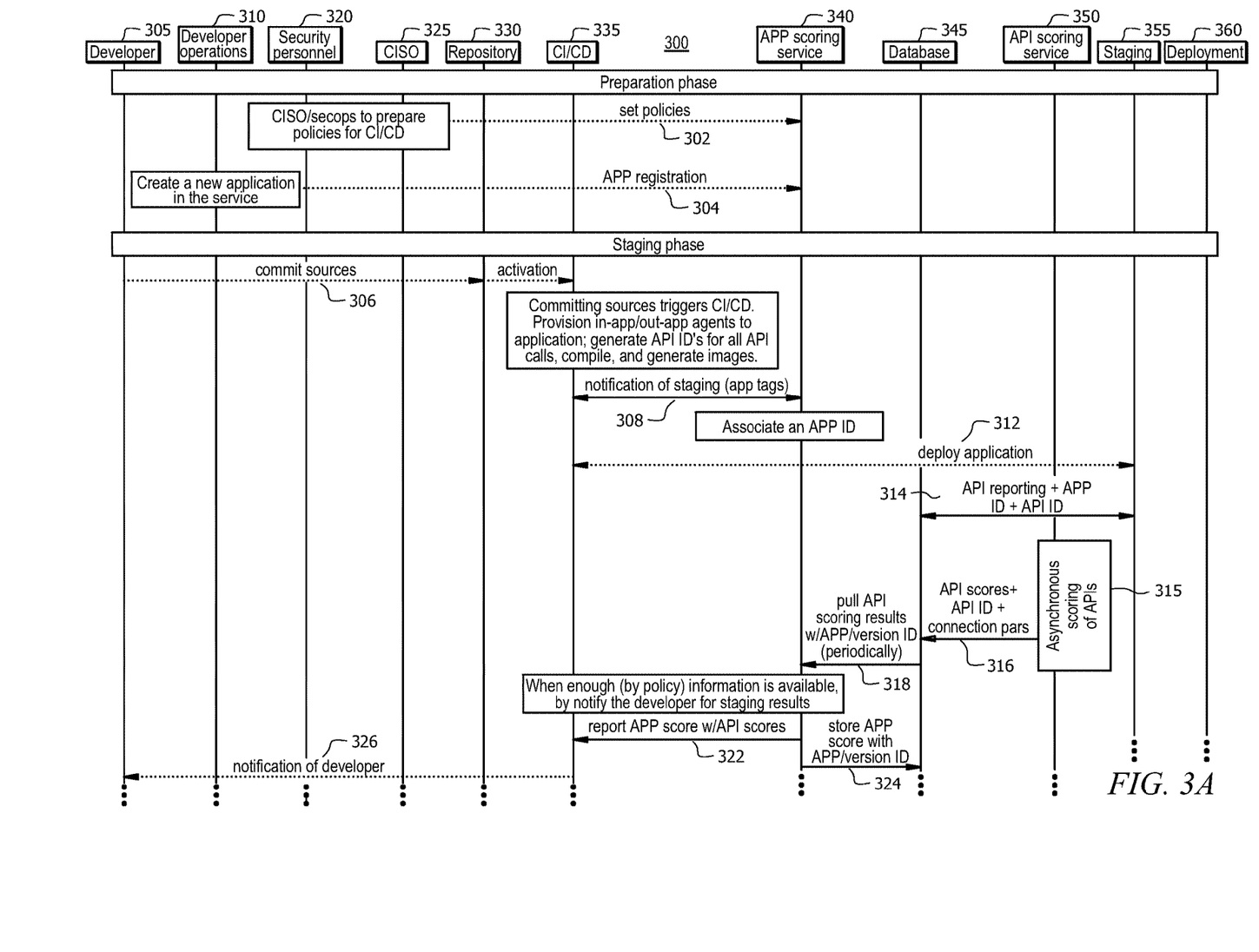
FIG. 3A illustrates a flow diagram of a method for integrating the automatic assessment of API service security standing via API reputation scoring into a staging phase of a continuous integration/continuous delivery (CI/CD) pipeline, in accordance with certain embodiments.
Figure 3B:
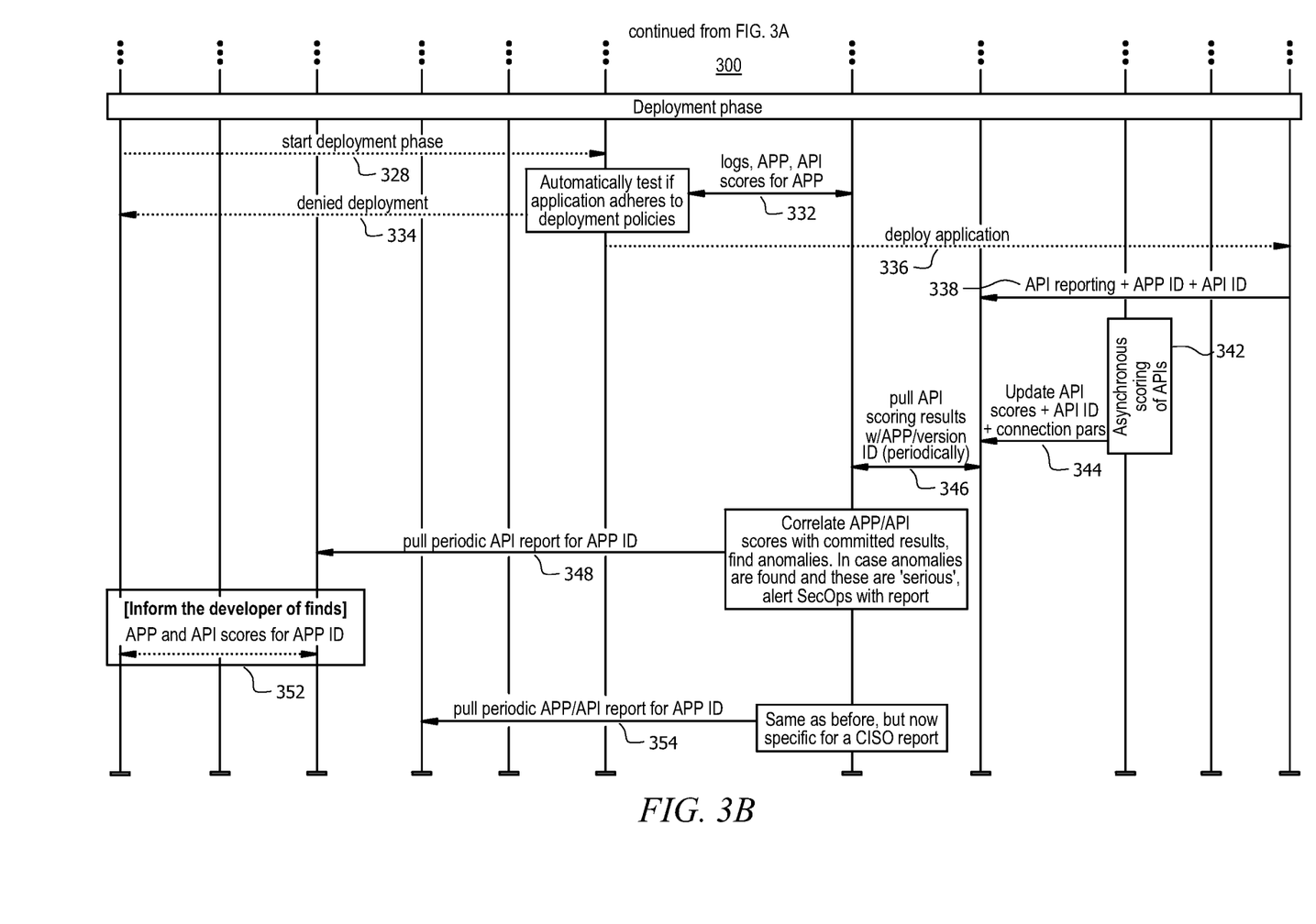
FIG. 3B illustrates a flow diagram of a method for integrating the automatic assessment of API service security standing via API reputation scoring into a deployment phase of a CI/CD pipeline, in accordance with certain embodiments.

Reference is now made to FIGS. 3A and 3B, wherein are shown a method 300 for a integrating the automatic assessment of API service security standing via API reputation scoring into a continuous integration/continuous delivery (CI/CD) pipeline, in accordance with the present disclosure. FIG. 3A is directed to the preparation and staging phases of an enterprise application. FIG. 3B is directed to the deployment phase of an enterprise application. As shown in FIGS. 3A and 3B, the development of an enterprise application may require a number of entities and/or system components. These are defined as follows. A developer 305 may comprise a person, persons, or machine writing enterprise applications. In writing enterprise applications, developers may use external or internal API services, for which scoring is required to ensure security insights and control. Developer operations 310 may comprise a person, persons, or machine controlling the enterprise's cloud system and the enterprise applications hosted in that cloud. Security personnel 320 (also referred to as "secops") may comprise a person, persons, or machine responsible for enforcing security policies in an enterprise. A Chief Information Security Officer (CISO) 325 is executive responsible for the security of the enterprise application. The repository 330 is a repository or storehouse of enterprise application sources. The CI/CD toolchain 335 may comprise continuous integration/continuous development tools that assist the developer to deploy an enterprise application in staging and deployment phases. The APP scoring service 340 is a service that collects and compiles the API reputation scores of API services (as scored by the API reputation scoring service 350) that are called by the staged application and generates a composite score. The database 345 may comprise a database for storing information associated with API services called by an enterprise application, as well as information (e.g., APP identifier) associated with the enterprise application. The database 345 may be configured as a part of the APP scoring service 340, as a part of the API reputation scoring service 350, or as a standalone storage module. The API reputation scoring service 350 (which corresponds to the reputation scoring system 160 of FIG. 1) may comprise a service for scoring one or more API services and/or API endpoints associated with the API services. Staging 355 may comprise the staging phase of an enterprise application to assess its security stance. Deployment 360 may comprise the deployment phase of the application before it is rolled out. Together, elements 305-335 may comprise what the present disclosure refers to as "the CI/CD pipeline."

With reference to FIG. 3A, the preparation phase may begin at step 302, security personnel 320 and/or an enterprise CISO may define a set of policies by which an enterprise application is to be controlled. These policies are defined and actuated in the APP scoring service 340, and specifically, are registered in a database (e.g., database 345) associated with the APP scoring service 340.

At step 304, developer operations 310 may create an operating environment for a new enterprise application that needs to be produced by the development community and/or confirms that an existing application is placed in an environment where the developer 305 may work on the enterprise application. The enterprise application may be registered in the database (e.g., database 345) associated with the APP scoring service 340.

Next, in the staging phase, as the developer 305 builds the enterprise application, at step 306, the staging process may commence. All application source material is committed to the source repository (e.g., github). As a consequence of this "commit," the CI/CD toolchain 335 is activated. When the CI/CD toolchain 335 is activated, one or more agents may be provisioned in the application through automated scripts activated in the CI/CD toolchain 335. These agents may be "in-app" (e.g., based on application performance management (APM)) or "out-app" (e.g., based on ISTIO/envoy). API identifiers may be defined for the API calls from the enterprise application and the images representing the application are generated.

At step 308, the APP scoring service 340 is notified of the staging of the enterprise application. The APP scoring service 340 may then assign an APP identifier to the enterprise application. At step 312, the enterprise application may be rolled out in a CI/CD staging mode and the application may run in a staged cloud environment. As the application runs in the staged cloud environment, the application may call one or more API services and/or API endpoints.

At step 314, the API services or endpoints called by the enterprise application, along with APP and API identifiers, are reported by an agent (which is embedded within the application) and stored into a database 345 associated with the API reputation scoring service 350. Storing this information into the database 345 triggers step 315, wherein the API reputation scoring service 350 obtains telemetry for those API endpoints from various telemetry sources (e.g., by connecting to external telemetry providers) and/or produces its own telemetry (performance analysis, API testing, etc.). Telemetry may be collected for each API service and/or associated endpoint called by the application, as described above in conjunction with FIGS. 1 and 2. The telemetry is used by API reputation scoring service 350 to generate a reputation score for each API service that is called by the application. At step 316, the reputation score of each API service called by the application is stored in the database 345.

At step 318, the APP scoring service 340 pulls (collects and compiles) the reputation scores of the called API services from the database to generate an overall or composite score. In an embodiment, the composite score may comprise a weighted score that may be used to determine whether and/or how to deploy the staged application. In another embodiment, the composite score may further comprise a set or collection of individual reputation scores of the called API services that are available for the CI/CD pipeline to evaluate and assess. In yet another embodiment, the composite score may comprise both the weighted score and the set/collection of individual reputation scores of the called API services. In this step, by policy, the APP scoring service 340 may place specific weight on certain reputation scores and/or telemetry (e.g., when TLS certificate handling is important, its relative importance in the overall scoring is increased; or when the service does not respond appropriately to API service requests, when invalid tokens provide service, or when specific CVEs are important, any of these may determine the score assigned to a given API service, which in turn may determine the overall score of the application). Finally, at step 322, when a threshold amount of information and/or number of reputation scores have been collected (the threshold determined by policy) by the APP scoring service 340, the composite score (i.e., the weighted score, as well as the set or collection of individual reputation scores of the called API services) is made available to the CI/CD toolchain 335. In FIG. 3A, the composite score is termed as "results" and/or an "APP score". At step 324, the composite score is also stored in the database 345. At step 326, the developer 305 is notified of the composite score.

With reference now to FIG. 3B, in the deployment phase, if the developer 305 and/or security personnel 320 is satisfied with the composite score, at step 328, deployment of the application may be initiated. For this, at step 332, all of the scoring information is obtained from the database for the enterprise application and when the deployment does not violate any deployment rules, at step 336, the enterprise application may be rolled out for production. If any of the deployment policies are violated, the developer 305 is notified, and the developer may take corrective action, including by (at step 334), denying the enterprise application deployment. Reasons for denying application deployment may be that the used API services are not on the approved list, the API services may have a poor reputation score, or any other reason determined by appropriate personnel.

At steps 328-346, the scoring procedures as shown at steps 314-318 may be repeated. Here telemetry may be obtained for used API endpoints during the deployment phase of the enterprise application. This is important to make sure that an application remains compliant with enterprise deployment policies. If an API endpoint's reputation deteriorates while active, the application may be suspended, the score of the API service may be reported to appropriate personnel, or other corrective actions may be taken. At step 348, an application may (optionally) be prohibited to run, the API service may be quarantined, the application may be prohibited from transmitting certain data, etc., as dictated through API security policies. Lastly, at step 354, a poor API reputation score may require notification to security personnel and/or the CISO of the enterprise of this event. In such cases, a CISO may interact with the customers of the impacted enterprise application pro-actively. Step 352, the developer may be notified of the state of their application to enable pro-active development action.

It is to be understood that while the flow diagrams of method 300, as shown in FIGS. 3A and 3B, describe the scoring of API services, the enforcement of policies is also a key feature of method 300. When one or more API services have been scored, a set of policies are made available to application agents (e.g., in ISTIO/envoy) that enforce the specific enterprise policies. As the application runs, security personal may enact these policies and the agent may enforces them. These policies may include instructions for specific URL handling for API services, for specific data classification fields, and/or for specific HTTP (create, read, update, and delete) operations, as described above.

In sum, the systems and methods of the present disclosure may allow for mechanisms that analyze API services used by specific enterprise applications, associates reputation score(s) through the analysis, and uses these score(s) to police the specific enterprise applications when they calls those API services. The systems and methods of the present disclosure may be beneficial in various uses.

For example, in some embodiments, the API reputation scoring mechanism may be used to generate an application-specific cybersecurity insurance policy rating for automatic cybersecurity insurance policies. As cyber threats multiply in scope and impact, there is an increasing need for insurance to provide a smooth funding mechanism for recovery in cases of substantial loss. Specifically, when an application uses a series of third party API services, the application may expose the users of that application to a certain risk. Data may leak to or intrusions may occur through the API service. For poorly implemented services, a distributed denial-of-service (DDoS) attack to the external API service may render the service useless, thereby hindering and stalling the application. When use of the external API service is associated to an overall risk score, the risk score can be sold to an insurance company that can underwrite the risk. If the risk score drops, the cybersecurity insurance rates/costs may increase, as the probability of attack and loss increases. This enables the application owner to balance between the cost of misuse and the speed of application development.

In a specific embodiment for the insurance use case, the mechanism of API reputation scoring may be applied to determine a risk that may be used to insure an individual API service or broadened to insure an enterprise application, wherein a weighted risk rating may be determined as follows:

Eq. (1) APP Weighted Risk Rating=$(\Sigma_1^N$ API Rating $(i) \times BusinessImpact(i))/\Sigma_1^N$ BusinessImpact$(i)$ In other words, the risk rating of an application may be fully described by the sum of the weighted ratings of its constituent APIs and dependencies, where the API rating is, for example, a numerical value (e.g., ranging from 1-100) and the weight is the business impact, also a numerical value (e.g., ranging from 1-100). For example, suppose a first API service (API 1) has a rating of 10 (corresponding to a relatively low risk rating) and a business impact of 100 (a high business impact), and a second API service (API 2) has a rating of 40 and business impact of 50. Based on Eq. (1), the weighted rating would be (10×100+40×50)/(100+50) =20. The numerical range of (1-100) above for API rating and business impact is illustrative and may be any range. The APP weighted risk rating, just as a bond rating in financial services, can then be matched against a probability of personal and property loss due to cyber security causes, which counterparties can insure against via a cyber underwriter.

Other use cases are contemplated by the present disclosure, and it is to be understood that the scoring mechanisms and policies of the present disclosure are not intended to the limited to the specific embodiments or use case described herein.

Figure 4:
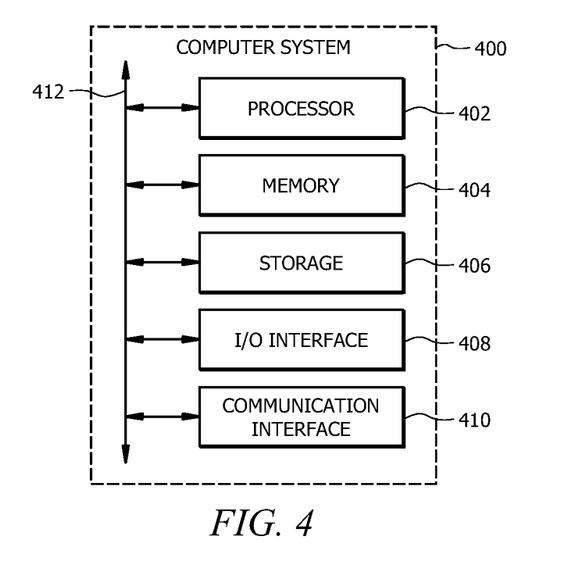
FIG. 4 illustrates a computer system, in accordance with certain embodiments.

Reference is now made to FIG. 4, wherein is shown an example computer system 400. In particular embodiments, one or more computer systems 400 perform one or more steps of one or more methods described or illustrated herein. In particular embodiments, one or more computer systems 400 provide functionality described or illustrated herein. In particular embodiments, software running on one or more computer systems 400 performs one or more steps of one or more methods described or illustrated herein or provides functionality described or illustrated herein. Particular embodiments include one or more portions of one or more computer systems 400. Herein, reference to a computer system may encompass a computing device, and vice versa, where appropriate. Moreover, reference to a computer system may encompass one or more computer systems, where appropriate.

This disclosure contemplates any suitable number of computer systems 400. This disclosure contemplates computer system 400 taking any suitable physical form. As example and not by way of limitation, computer system 400 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, an augmented/virtual reality device, or a combination of two or more of these. Where appropriate, computer system 400 may include one or more computer systems 400; be unitary or distributed; span multiple locations; span multiple machines; span multiple data centers; or reside in a cloud, which may include one or more cloud components in one or more networks. Where appropriate, one or more computer systems 400 may perform without substantial spatial or temporal limitation one or more steps of one or more methods described or illustrated herein. As an example and not by way of limitation, one or more computer systems 400 may perform in real time or in batch mode one or more steps of one or more methods described or illustrated herein. One or more computer systems 400 may perform at different times or at different locations one or more steps of one or more methods described or illustrated herein, where appropriate.

In particular embodiments, computer system 400 includes a processor 402, memory 404, storage 406, an input/output (I/O) interface 408, a communication interface 410, and a bus 412. Although this disclosure describes and illustrates a particular computer system having a particular number of particular components in a particular arrangement, this disclosure contemplates any suitable computer system having any suitable number of any suitable components in any suitable arrangement.

In particular embodiments, processor 402 includes hardware for executing instructions, such as those making up a computer program. As an example and not by way of limitation, to execute instructions, processor 402 may retrieve (or fetch) the instructions from an internal register, an internal cache, memory 404, or storage 406; decode and execute them; and then write one or more results to an internal register, an internal cache, memory 404, or storage 406. In particular embodiments, processor 402 may include one or more internal caches for data, instructions, or addresses. This disclosure contemplates processor 402 including any suitable number of any suitable internal caches, where appropriate. As an example and not by way of limitation, processor 402 may include one or more instruction caches, one or more data caches, and one or more translation lookaside buffers (TLBs). Instructions in the instruction caches may be copies of instructions in memory 404 or storage 406, and the instruction caches may speed up retrieval of those instructions by processor 402. Data in the data caches may be copies of data in memory 404 or storage 406 for instructions executing at processor 402 to operate on; the results of previous instructions executed at processor 402 for access by subsequent instructions executing at processor 402 or for writing to memory 404 or storage 406; or other suitable data. The data caches may speed up read or write operations by processor 402. The TLBs may speed up virtual-address translation for processor 402. In particular embodiments, processor 402 may include one or more internal registers for data, instructions, or addresses. This disclosure contemplates processor 402 including any suitable number of any suitable internal registers, where appropriate. Where appropriate, processor 402 may include one or more arithmetic logic units (ALUs); be a multi-core processor; or include one or more processors 402. Although this disclosure describes and illustrates a particular processor, this disclosure contemplates any suitable processor.

In particular embodiments, memory 404 includes main memory for storing instructions for processor 402 to execute or data for processor 402 to operate on. As an example and not by way of limitation, computer system 400 may load instructions from storage 406 or another source (such as, for example, another computer system 400) to memory 404. Processor 402 may then load the instructions from memory 404 to an internal register or internal cache. To execute the instructions, processor 402 may retrieve the instructions from the internal register or internal cache and decode them. During or after execution of the instructions, processor 402 may write one or more results (which may be intermediate or final results) to the internal register or internal cache. Processor 402 may then write one or more of those results to memory 404. In particular embodiments, processor 402 executes only instructions in one or more internal registers or internal caches or in memory 404 (as opposed to storage 406 or elsewhere) and operates only on data in one or more internal registers or internal caches or in memory 404 (as opposed to storage 406 or elsewhere). One or more memory buses (which may each include an address bus and a data bus) may couple processor 402 to memory 404. Bus 412 may include one or more memory buses, as described below. In particular embodiments, one or more memory management units (MMUs) reside between processor 402 and memory 404 and facilitate accesses to memory 404 requested by processor 402. In particular embodiments, memory 404 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 404 may include one or more memories 404, where appropriate. Although this disclosure describes and illustrates particular memory, this disclosure contemplates any suitable memory.

In particular embodiments, storage 406 includes mass storage for data or instructions. As an example and not by way of limitation, storage 406 may include a hard disk drive (HDD), a floppy disk drive, flash memory, an optical disc, a magneto-optical disc, magnetic tape, or a Universal Serial Bus (USB) drive or a combination of two or more of these. Storage 406 may include removable or non-removable (or fixed) media, where appropriate. Storage 406 may be internal or external to computer system 400, where appropriate. In particular embodiments, storage 406 is non-volatile, solid-state memory. In particular embodiments, storage 406 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 406 taking any suitable physical form. Storage 406 may include one or more storage control units facilitating communication between processor 402 and storage 406, where appropriate. Where appropriate, storage 406 may include one or more storages 406. Although this disclosure describes and illustrates particular storage, this disclosure contemplates any suitable storage.

In particular embodiments, I/O interface 408 includes hardware, software, or both, providing one or more interfaces for communication between computer system 400 and one or more I/O devices. Computer system 400 may include one or more of these I/O devices, where appropriate. One or more of these I/O devices may enable communication between a person and computer system 400. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 408 for them. Where appropriate, I/O interface 408 may include one or more device or software drivers enabling processor 402 to drive one or more of these I/O devices. I/O interface 408 may include one or more I/O interfaces 408, where appropriate. Although this disclosure describes and illustrates a particular I/O interface, this disclosure contemplates any suitable I/O interface.

In particular embodiments, communication interface 410 includes hardware, software, or both providing one or more interfaces for communication (such as, for example, packet-based communication) between computer system 400 and one or more other computer systems 400 or one or more networks. As an example and not by way of limitation, communication interface 410 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 410 for it. As an example and not by way of limitation, computer system 400 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 400 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network, a Long-Term Evolution (LTE) network, or a 5G network), or other suitable wireless network or a combination of two or more of these. Computer system 400 may include any suitable communication interface 410 for any of these networks, where appropriate. Communication interface 410 may include one or more communication interfaces 410, where appropriate. Although this disclosure describes and illustrates a particular communication interface, this disclosure contemplates any suitable communication interface.

In particular embodiments, bus 412 includes hardware, software, or both coupling components of computer system 400 to each other. As an example and not by way of limitation, bus 412 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 412 may include one or more buses 412, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

The embodiments disclosed herein are only examples, and the scope of this disclosure is not limited to them. Particular embodiments may include all, some, or none of the components, elements, features, functions, operations, or steps of the embodiments disclosed herein. Embodiments according to the disclosure are in particular disclosed in the attached claims directed to a method, a storage medium, a system and a computer program product, wherein any feature mentioned in one claim category, e.g. method, can be claimed in another claim category, e.g. system, as well. The dependencies or references back in the attached claims are chosen for formal reasons only. However, any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

What is claimed is:

1. A system, comprising:
one or more processors;
one or more computer-readable non-transitory storage media comprising instructions that, when executed by the one or more processors, cause one or more components of the system to perform operations comprising:
identifying an API service called by an application based on information provided by an agent embedded within the application, wherein the agent comprises a software module embedded within the application and the agent is configured to interact with data plane traffic between the application and the API service;
collecting telemetry associated with the API service, the telemetry collected from one or more telemetry sources and indicating any deficiencies in the API service;
generating a reputation score for the API service based on analysis of the collected telemetry; and
transmitting the reputation score to at least one of the following:
the agent embedded within the application, wherein the reputation score is associated with at least one policy having at least one policy action, and wherein the reputation score is operable to be used by the agent to invoke the at least one policy action relating to use of the API service by the application; or
a continuous integration/continuous delivery (CI/CD) pipeline associated with the application, wherein the reputation score is operable to be used by the CI/CD pipeline to determine deployment policies of the application.

2. The system of claim 1, further comprising the operations of:
defining the at least one policy based on the reputation score; and
transmitting the at least one policy to the agent.

3. The system of claim 1, wherein the at least one policy action mitigates one or more risks associated with use of the API service by the application.

4. The system of claim 1, wherein the at least one policy is directed to at least one of the following:
one or more Uniform Resource Locators (URLs) associated with the API service;
one or more hypertext transfer protocol (HTTP) operations associated with the API service; or
one or more defined categories of data transmitted across an API interface to the API service.

5. The system of claim 1, wherein the reputation score comprises a weighted score based on the collected telemetry, and wherein one or more weights assigned to the collected telemetry is operable to be updated over time.

6. The system of claim 1, further comprising the operation of:
updating the reputation score of the API service based on collection of new telemetry, wherein the updated reputation score is operable to be used by the agent to invoke an updated policy action.

7. The system of claim 1, further comprising the operation of:
updating the reputation score of the API service based on collection of new telemetry, wherein the updated reputation score is operable to be used by the CI/CD pipeline to update the deployment policies of the application.

8. A method, comprising:
identifying an API service called by an application based on information provided by an agent embedded within the application, wherein the agent comprises a software module embedded within the application and the agent is configured to interact with data plane traffic between the application and the API service;
collecting telemetry associated with the API service, the telemetry collected from one or more telemetry sources and indicating any deficiencies in the API service;
generating a reputation score for the API service based on analysis of the collected telemetry; and
transmitting the reputation score to at least one of the following:
the agent embedded within the application, wherein the reputation score is associated with at least one policy having at least one policy action, and wherein the reputation score is operable to be used by the agent to invoke the at least one policy action relating to use of the API service by the application; or
a continuous integration/continuous delivery (CI/CD) pipeline associated with the application, wherein the reputation score is operable to be used by the CI/CD pipeline to determine deployment policies of the application.

9. The method of claim 8, further comprising the steps of:
defining the at least one policy based on the reputation score; and
transmitting the at least one policy to the agent.

10. The method of claim 8, wherein the at least one policy action mitigates one or more risks associated with use of the API service by the application.

11. The method of claim 8, wherein the at least one policy is directed to at least one of the following:
one or more Uniform Resource Locators (URLs) associated with the API service;
one or more hypertext transfer protocol (HTTP) operations associated with the API service; or
one or more defined categories of data transmitted across an API interface to the API service.

12. The method of claim 8, wherein the reputation score comprises a weighted score based on the collected telemetry, and wherein one or more weights assigned to the collected telemetry is operable to be updated over time.

13. The method of claim 8, further comprising the step of:
updating the reputation score of the API service based on collection of new telemetry, wherein the updated reputation score is operable to be used by the agent to invoke an updated policy action.

14. The method of claim 8, further comprising the step of:
updating the reputation score of the API service based on collection of new telemetry, wherein the updated reputation score is operable to be used by the CI/CD pipeline to update the deployment policies of the application.

15. One or more computer-readable non-transitory storage media embodying instructions that, when executed by a processor, cause performance of operations comprising:
identifying an API service called by an application based on information provided by an agent embedded within the application, wherein the agent comprises a software module embedded within the application and the agent is configured to interact with data plane traffic between the application and the API service;

collecting telemetry associated with the API service, the telemetry collected from one or more telemetry sources and indicating any deficiencies in the API service;

generating a reputation score for the API service based on analysis of the collected telemetry; and transmitting the reputation score to at least one of the following:

the agent embedded within the application, wherein the reputation score is associated with at least one policy having at least one policy action, and wherein the reputation score is operable to be used by the agent to invoke the at least one policy action relating to use of the API service by the application; or a continuous integration/continuous delivery (CI/CD) pipeline associated with the application, wherein the reputation score is operable to be used by the CI/CD pipeline to determine deployment policies of the application.

16. The one or more computer-readable non-transitory storage media of claim 15, further comprising the operations of:

defining the at least one policy based on the reputation score; and transmitting the at least one policy to the agent.

17. The one or more computer-readable non-transitory storage media of claim 15, wherein the at least one policy action mitigates one or more risks associated with use of the API service by the application.

18. The one or more computer-readable non-transitory storage media of claim 15, wherein the at least one policy is directed to at least one of the following:

one or more Uniform Resource Locators (URLs) associated with the API service;

one or more hypertext transfer protocol (HTTP) operations associated with the API service; or one or more defined categories of data transmitted across an API interface to the API service.

19. The one or more computer-readable non-transitory storage media of claim 15, wherein the reputation score comprises a weighted score based on the collected telemetry, and wherein one or more weights assigned to the collected telemetry is operable to be updated over time.

20. The one or more computer-readable non-transitory storage media of claim 15, further comprising the operation of:

updating the reputation score of the API service based on collection of new telemetry, wherein the updated reputation score is operable to be used by the CI/CD pipeline to update the deployment policies of the application.

* * * * *